Figure 1:
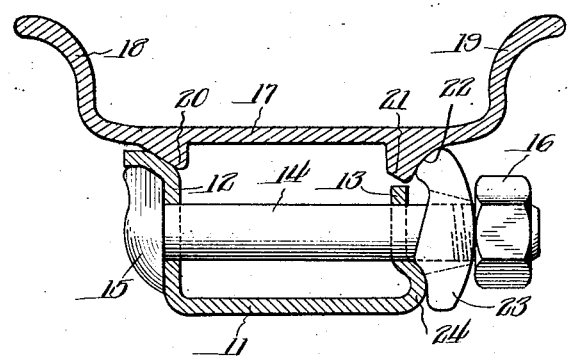

Aug. 11, 1931.   A. S. VAN HALTEREN   1,818,440

RIM MOUNTING

Filed Feb. 14, 1927

Inventor
Andrew S. Van Halteren,
By Cromwell, Greist & Warden
Attys.

Patented Aug. 11, 1931

1,818,440

UNITED STATES PATENT OFFICE

ANDREW S. VAN HALTEREN, OF EAST LANSING, MICHIGAN, ASSIGNOR, BY MESNE ASSIGNMENTS, TO MOTOR WHEEL CORPORATION, OF LANSING, MICHIGAN, A CORPORATION OF MICHIGAN

RIM MOUNTING

Application filed February 14, 1927. Serial No. 167,878.

The present invention relates to the assembly of a demountable tire-carrying rim upon the fixed rim or felly of a vehicle wheel. The invention has for its principal objects the ready mounting and demounting of the rim, the securing of a firm placement of the rim under initial lateral and ultimate radial stress, the adapting of a narrow felly to the accommodation of rims of greater width, economy of material and ease of manufacture.

To the accomplishing of this purpose, the invention involves distinctive features of construction, and cooperation in the rim-securing member and those portions of the felly and rim upon which it bears, as will be hereinafter more fully disclosed.

To facilitate an understanding of the invention, embodiments of the same in connection with rims of diverse type are, in the accompanaying drawings, set forth by way of illustration and as a basis for a more detailed description of such exemplary embodiments.

Figure 2:
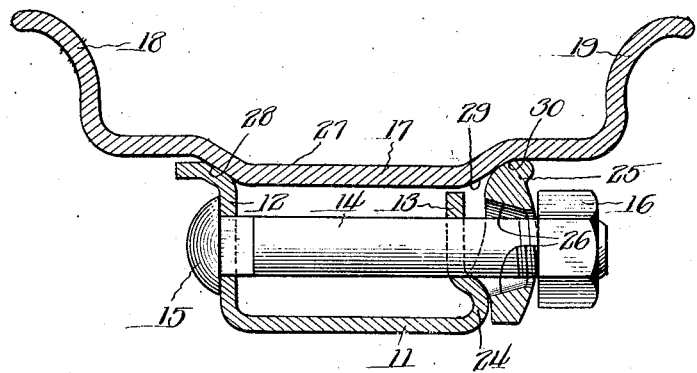

In the drawings:

Fig. 1 is a transverse section through a fixed and demountable rim assembly including a rim of the interiorly ribbed type; and Fig. 2 is a similar section of an assembly including a rim of the semi-drop base type.

Having reference to Fig. 1 of the drawings, the fixed rim or felly, forming of itself no distinctive feature of the present invention, is of the type comprising a bottom 11 and side walls 12 and 13, the wall 12 having its margin obliquely arranged to form a rear rim seat while the wall 13 is of less height, both walls being apertured to accommodate clamping bolts 14 headed at 15, and threaded to receive the nut 16.

The rim 17 is a straight side type having side tire-retaining beads 18 and 19 and interiorly arranged ribs 20 and 21, the former arranged to have a wedge bearing upon the rim seat of the felly wall 12 for supporting the rim at the rear, while the latter clears the wall 13 of the felly. The front face of the rib 21 forms, in conjunction with the inner side of the rim, a forwardly and inwardly facing concave bearing surface as indicated at 22.

The rim positioning and securing member, which may be in the form of a plurality of lugs 23 or in the form of an annulus, is provided with a rearwardly flaring slot, being substantially circular at the front face of the lug and substantially elongated at its rear face, the width of the slot being substantially uniform throughout. Such construction of the rim-securing member permits of a rocking of the same on the bolt in a radial plane of the wheel, and thus enables the said member to adjust itself to the bearing surfaces on the rim and on the felly.

In the preferred form of construction, the junction between the walls 11 and 13 of the felly is such as to provide at 24 a forwardly and outwardly convex bearing surface adapted to enter and form a rolling fulcrum bearing for the bearing surface on the rear face of the inner extremity of the lug 23, while the concave bearing surface 22 on the rim receives and cooperates with the convex face of the outer extremity of said lug.

As the nut 16 is screwed home upon the bolt or stud 14, the initial effect is to push the rim 17 to the rear and position the same upon its rear seat. Such position of the rim having been attained, its resistance to further lateral movement causes the outer convex bearing face of the lug to ride upon the concave bearing surface of the rib 21 and thus force the rim radially outward. The action of the lug on the rib 21 and the coaction of the rib 20 upon the oblique surface of the felly wall 12 is to radially stress the rim and thus secure and maintain a firm placement of the rim on the felly. The action between the respective convex and concave bearing surfaces of the lug and rim and felly, cooperate with the permissible rocking movement of the lug upon the bolt to produce accurate seating of the rim upon the felly and a maintenance of the rim in place under equalized stresses.

Having reference now to Fig. 2 of the drawings, the felly or fixed rim and the bolt are substantially the same as previously illustrated and described. The rim positioning and securing member here represented is of the same cross section as that previously illustrated and described, but is shown as a section 25 of an annulus with the flaring walls of the slot shown in full lines at 26.

The rim 27 is of the semi-drop base type, wherein the drop base provides at the rear the inclined portion 28 for cooperation and seating upon the oblique margin of the felly wall 12, while at the front the incline 29, taking the place of the rib 21 of Fig. 1, provides with the under face of the rim base proper a forwardly and inwardly facing concave bearing surface 30 for engagement by and cooperation with the convex outer extremity of the rim-securing member 35. As before described, a concave bearing surface on the inner extremity of the member 25 receives and cooperates with the convex bearing surface 24 of the felly to form a rolling fulcrum.

The operation and functioning of the parts are the same in this form of construction as in that previously described.

It will be observed that a split clamping ring such as that which is usually used in connection with the ribbed type of rim for interposition between the rim-securing lug and the face of the rib is dispensed with, rendering possible the employment of a rim of greater width with a felly of a given size. Similarly it will be observed, by reference to Fig. 2, that the employment of this construction in connection with a rim of the drop-base type enables the employment of a wide rim with an exceptionally narrow felly.

I claim:

In a rim mounting, the combination with a fixed rim or felly providing a rear rim seat and at its front a forwardly and outwardly facing convex bearing surface, and a demountable rim adapted to seat at the rear on the felly and having at its front a forwardly and inwardly facing concave bearing surface, of a rim positioning and securing member having adjacent its inner extremity a concave bearing surface and at its outer extremity a convex bearing surface for engagement respectively with the bearing surfaces of the felly and rim, the inner concave bearing surface being on a flatter arc than the cooperating convex bearing surface, said rim positioning and securing member provided with a transverse tapering slot, and a bolt member connecting with the felly and lying in the slot and having an adjustable bearing on the rim-securing member at the smaller end of the tapering slot to rock the said member in a radial wheel plane while progressively forcing the rim to the rear and radially for positioning and tightening the same.

In testimony whereof I have hereunto signed my name.

ANDREW S. VAN HALTEREN.